No. 708,462. Patented Sept. 2, 1902.
G. CAWLEY.
VEHICLE TO BE USED IN ELECTRIC TRACTION ON RAILWAYS.
(Application filed June 3, 1902.)
(No Model.)
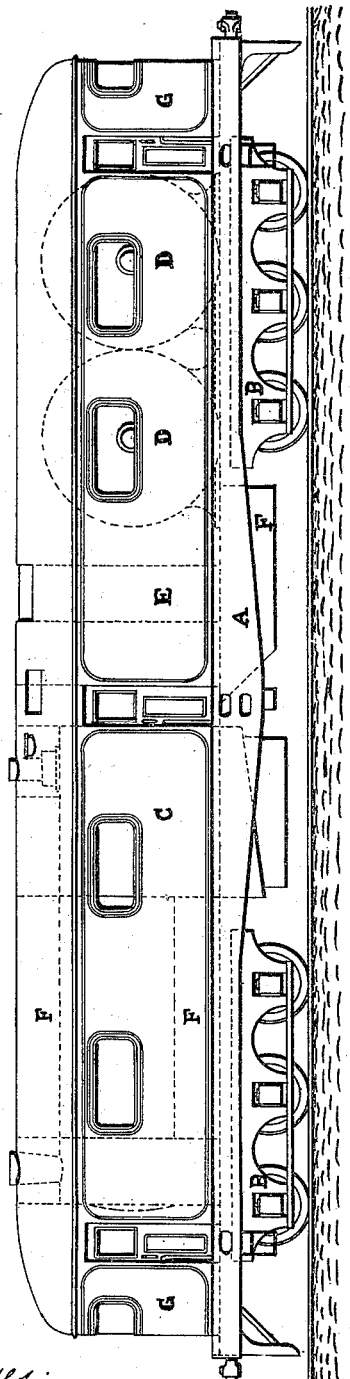
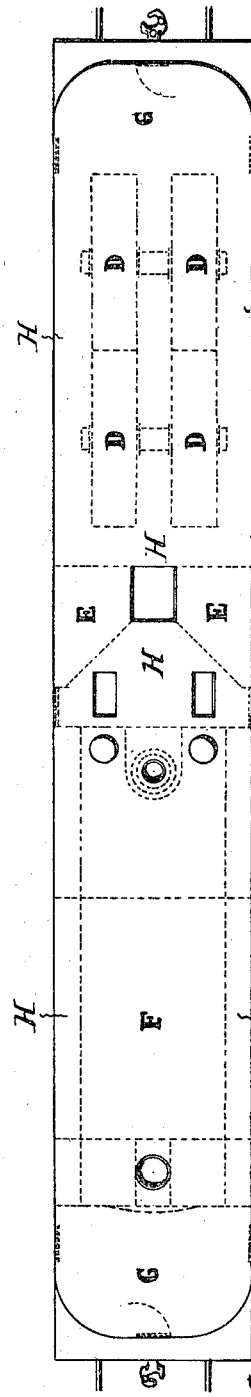

UNITED STATES PATENT OFFICE.

GEORGE CAWLEY, OF WESTMINSTER, ENGLAND.

VEHICLE TO BE USED IN ELECTRIC TRACTION ON RAILWAYS.

SPECIFICATION forming part of Letters Patent No. 708,462, dated September 2, 1902.

Application filed June 3, 1902. Serial No. 110,120. (No model.)

*To all whom it may concern:*

Be it known that I, GEORGE CAWLEY, civil and mechanical engineer, a subject of the King of Great Britain and Ireland, residing at 29 Great George street, in the city of Westminster, England, have invented a certain new and useful Vehicle to be Used in Electric Traction on Railways; and I do hereby declare the following to be a full, clear, and exact description of the invention, such as will enable others skilled in the art to which it appertains to make and use the same.

My invention has for its object to provide a vehicle in which electrical energy is utilized to great advantage for electric traction on railways, superseding the use of ordinary steam-locomotives and the use of fixed electric generating-stations and conductors as ordinarily used in electric railways, and the weight to be equally distributed over each pair of running-wheels in a manner which cannot be done with steam-locomotives. With this object I provide a framing supported upon bogies in such a manner that the width of the framing is not restricted by the wheels, as in ordinary locomotives, but can be extended to or beyond the vertical plane in which the bogie-wheels are situated, and I thus provide a base upon which I can mount a boiler or boilers sufficiently powerful to operate engines, which in turn actuate dynamos by which electric current is generated upon the vehicle itself, and the said current is employed to actuate motors on or connected with all or any desired number of the axles of the wheels of the bogies and also, if required, to the axles of the wheels of other vehicles connected with the said vehicle. The said framing also carries water-tanks, fuel-bunkers, and the regulating and measuring appliances necessary for controlling the apparatus and the current generated by it.

The accompanying drawings represent in side elevation in Figure 1 and in plan in Fig. 2 a vehicle constructed in accordance with my invention.

A is the framing carried by the two bogies B, each bogie being provided in the arrangement shown with three pairs of wheels. The framing A extends to or beyond the vertical plane in which the wheels are situated and is thus wide enough to support a boiler (indicated at C) sufficiently powerful to supply enough steam to operate engines for actuating dynamos for generating a powerful electric current. These engines and dynamos are indicated at D.

E represents fuel-bunkers, and F represents water-tanks above and below the boiler and underneath the frame.

The whole of the parts described are inclosed by a body part or casing with windows therein to admit light to the interior, this being arranged so as to include cabs G at each end of the vehicle and passages H along the sides of the boiler and between the fuel-bunkers E and through the engine-room, so that the attendant can pass from one cab to the other.

The arrangement described constitutes a locomotive electric generating plant, which can be itself propelled by the electric energy generated thereon, and this electric energy so generated can be supplied to the axles of the wheels of carriages or trucks attached to the said vehicle and can also be employed for other purposes required—such as for lighting the train, operating the brakes and the like for supplying light or power in the neighborhood of the vehicle.

By my invention I can employ electric traction on railways without having to supply it through long conductors or rails, as is necessary when electric current is supplied to the vehicles from stationary generating-stations in the ordinary way.

By the use of the vehicle according to my invention, constituting what may be termed a "traveling electric generating-station," I obtain greater economy in the current generated, as I do away with the resistance and leakage due to the use of long conductors.

I claim as my invention—

1. An electric vehicle, having a supporting-bogie at each end thereof and carrying a boiler, water-tanks above and below the boiler, and fuel-bunkers at one end of the boiler with engines and dynamos on the other side of the fuel-bunkers, substantially as described.

2. An electric vehicle, having a supporting-bogie at each end thereof and carrying a boiler, water-tanks above and below the boiler, and fuel-bunkers at one end of the boiler with engines and dynamos on the other side of the fuel-bunkers, in combination with a cab at each end of the vehicle and passages within the vehicle-body communicating from one part to the next throughout the vehicle, whereby access can be had from one cab, past the boiler and fuel-bunkers, to the engine-room and then to the other cab, substantially as described.

In testimony whereof I affix my signature in presence of two witnesses.

GEORGE CAWLEY.

Witnesses:
WILLIAM GERALD REYNOLDS,
PERCY READ GOLDRING.